United States Patent [19]

Hodges

[11] 3,992,651

[45] Nov. 16, 1976

[54] ACTIVE SYMMETRICAL COMPONENT NETWORK FOR PROTECTIVE RELAYS

[75] Inventor: Merwyn E. Hodges, Broomall, Pa.

[73] Assignee: General Electric Co., Phila, Pa.

[22] Filed: Apr. 1, 1975

[21] Appl. No.: 564,015

[52] U.S. Cl. .............................. 317/47; 317/48; 317/27 R; 317/46
[51] Int. Cl.² ........................................ H02H 3/26
[58] Field of Search ............... 317/47, 48, 27 R, 46; 324/86, 87, 83 A; 307/127; 340/253 Y, 253 H; 328/139, 133

[56] References Cited
UNITED STATES PATENTS

| | | | |
|---|---|---|---|
| 1,674,477 | 6/1928 | May ................................ | 317/27 X |
| 2,516,022 | 7/1950 | Sonnemann .......................... | 317/47 |
| 2,836,771 | 5/1958 | Jessee .................................. | 317/47 |
| 2,897,407 | 7/1959 | Morris .................................. | 317/47 |
| 3,110,844 | 11/1963 | Brandt, Jr. ............................ | 317/47 |
| 3,331,989 | 7/1967 | Schmidt et al. ..................... | 317/47 X |
| 3,736,470 | 5/1973 | Ford et al. .......................... | 317/47 X |
| 3,743,889 | 7/1973 | Lopez-Batiz ....................... | 317/47 X |

*Primary Examiner*—J. D. Miller
*Assistant Examiner*—Patrick R. Salce
*Attorney, Agent, or Firm*—J. Wesley Haubner

[57] ABSTRACT

A circuit responsive to selected symmetrical components of current in a three phase alternating current system. The component values of the circuit can be selected so that the circuit output is proportional only to the negative sequence components of current, only to the positive sequence components, or to both the positive and negative sequence components of current. The positive sequence response is 180° out of phase with the negative sequence response and the amount of positive sequence response can be adjusted without affecting the magnitude or phase of the negative sequence response.

15 Claims, 9 Drawing Figures

ACTIVE SYMMETRICAL COMPONENT NETWORK FOR PROTECTIVE RELAYS

BACKGROUND OF THE INVENTION

This invention relates to electric networks, and more particularly it relates to a phase sequence network or filter, responsive to selected symmetrical components of current in a polyphase alternating current electric power circuit.

The theory of symmetrical components is well understood by those skilled in the art of electric power transmission and distribution. In accordance with this theory, the phase currents or voltages in any unbalanced three-phase alternating-current electric circuit can be resolved into three sets of symmetrical, balanced current or voltages vectors known respectively as positive sequence, negative sequence and zero sequences components. The negative and zero sequence components of circuit current and voltage are not present under balanced circuit conditions. A more detailed discussion of the theory of symmetrical components can be found in the textbook, Symmetrical Components, by Wagner and Evans, published by McGraw-Hill in 1933.

It has been known that certain circuits, called sequence networks or filters, can be connected to an electric power system to provide an output signal that is proportional to the magnitude of the negative sequence components of current. These sequence networks or filters are particularly useful in the protective relaying art as they will sense the presence of negative sequence components of current which flow when the power system becomes unbalanced due to abnormal of fault conditions. It has also been known in the protective relaying art that it is desirable to have a sequence network that has a "mixed" response, that is, the output is a function of both the positive sequence components of current and the negative sequence components of current. One of the disadvantages of the prior art sequence networks that have a mixed response is that when the circuit values are adjusted to change the circuit response to the positive sequence components, the circuit's response to the negative sequence components also changes. I have found it desirable to have a sequence network in which the positive sequence response can be selectively varied without affecting the amplitude or phase of the circuit's response to the negative sequence components.

The output of the sequence sensitive circuit is a sine wave which generally must be further processed to derive a d-c control signal. Since the processing of the sine wave signal usually involves some filtering which delays the detection of the fault condition, it is desirable to keep the filter as small as possible.

It is, therefore, one object of this invention to provide a sequence network, responsive to both the positive sequence components and negative sequence components of a three phase alternating current power system, in which the response to the positive sequence components can be selectively varied without affecting the response to the negative sequence components.

It is another object of this invention to provide a mixed sequence responsive circuit in which the positive sequence response is 180° out of phase with the negative sequence response.

Another object of this invention is to reduce the filtering required to derive a control signal from the sine wave output of a sequence sensitive circuit.

SUMMARY OF THE INVENTION

In accordance with one embodiment of the invention there is provided a sequence sensitive circuit responsive to a three phase signal system, from which the zero sequence components of current have been removed, includig a resistor connected between a first of the phase signals and a summing point thereby generating a first current into the summing point in phase with and having a desired proportion to the first phase signal. Additional circuit means responsive to the second and third phase signals generates a second current into the summing point. The second current has a first component having the desired proportion to 1.155 times the amplitude of the second phase signal and having a phase lag of 30° from the second phase signal, and a second component having the desired proportion to 0.577 times the amplitude of the third phase signal and having a phase lag of 30° from the third phase signal. An operational amplifier responsive to the first and second generated currents at the summing point provides a sinusoidal voltage proportional to their sum.

The values of the components can be selected so that the circuit provides a response only to positive sequence components of current, only to negative sequence components of current or to both the positive and the negative sequence components.

The sequence sensitive circuit can be modified to produce the desired positive and negative sequence response even if the input signals contain zero sequence components.

A control signal related to the magnitude of the sequence response is obtained by using two sequence sensitive circuits whose output signals have the same amplitude but differs in phase by 90°, full wave rectifying the output of each sequence sensitive circuit and then using an analog OR circuit to provide an output signal proportional to the rectified signal having the larger amplitude.

DESCRIPTION OF THE DRAWINGS

While the specification concludes with claims particularly pointing out and distinctly claiming that which is regarded as the present invention, the objects and advantage of this invention can be more readily ascertained from the following description of a preferred embodiment when read in conjunction with the accompanying drawings in which:

DETAILED DESCRIPTION

Figure 1:
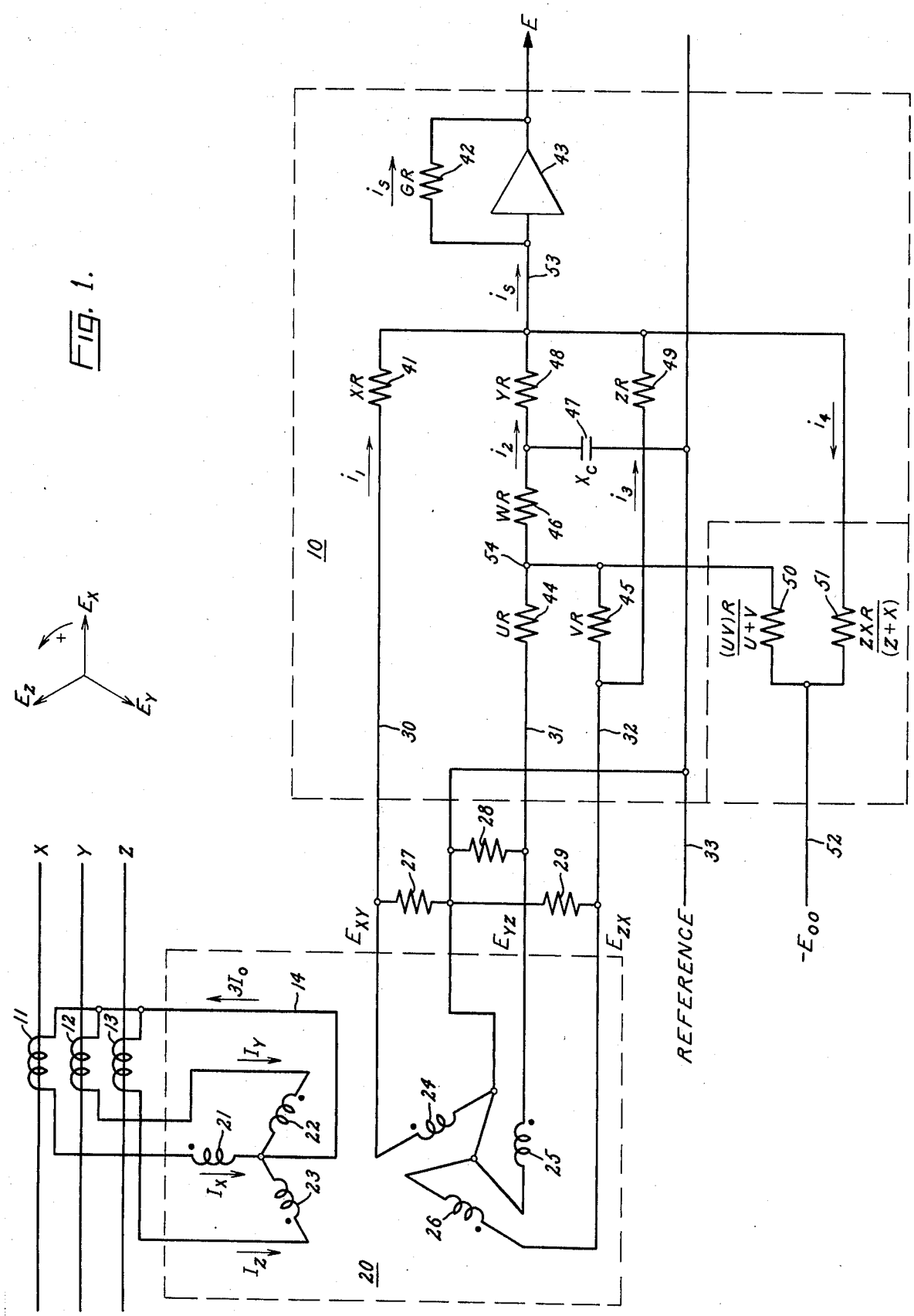
FIG. 1 is a schematic of a sequence selective circuit in accordance with my invention.

Referring now to FIG. 1, conductors X, Y, and Z are current conductors in a three phase alternating current power system. A sequence sensitive circuit 10 is coupled to the conductors X, Y, and Z and provides an output, E, that is related to the sequence components present in the power system.

In one embodiment of my invention it is necessary to eliminate the zero sequence components from the inputs 30, 31 and 32 of the sequence sensitive circuit 10. As shown in FIG. 1, this is accomplished by using line isolating current transformers 11, 12, and 13 to drive an auxiliary wye-delta current transformer 20. The primary windings 21, 22 and 23 of transformer 20 are wye connected and the secondaries of current transformers 11, 12 and 13 are connected respectively to primary windings 21, 22, and 23. Corresponding ends of each of the isolated delta windings 24, 25 and 26 are connected to a common reference 33. Burden resistors 27, 28, and 29 are placed across windings 24, 25 and 26 respectively to develop thereacross the voltage signals $E_{xy}$, $E_{yz}$ and $E_{zx}$. The voltage signals $E_{xy}$, $E_{yz}$ and $E_{zx}$ are applied respectively to inputs 30, 31 and 32 of the sequence sensitive circuit 10. The voltage signals $E_{xy}$, $E_{yz}$, and $E_{zy}$ will contain no zero sequence components or, in other words, they can be fully represented as the sum of symmetrical positive sequence and symmetrical negative sequence components only.

It will be readily apparent to those skilled in the art that there are other circuits which can generate the signals $E_{xy}$, $E_{yz}$ and $E_{zx}$. For example, the voltage on conductors X, Y and Z can be applied to a three phase potential transformer with delta connected primary windings with secondary windings having corresponding ends connected to a common reference.

As shown in FIG. 1, resistor 41 having a value XR is connected between input 30 and summing point 53, and resistor 49 having a value ZR is connected between input 32 and summing point 53. A resistor 44, having a value UR is connected between input 31 and junction 54 and resistor 45, having the value VR is connected between input 32 and junction 54. Resistor 46 having a value WR is connected between junction 54 and one end of resistor 48, having a value YR, the other end of resistor 48 being connected to the summing point 53. Capacitor 47 having an impedance of Xc at the power line frequency is connected between the junction of resistors 46 and 48 and the reference input 33. An operational amplifier 43 responds to the total current flowing through the summing point 53 to provide an output signal E. Resistor 42, having a value GR, and connected between the summing point 53 and the output of amplifier 43, establishes the gain of the sequence sensitive circuit 10.

When the input signals $E_{xy}$, $E_{yz}$ and $E_{zx}$ do not contain a zero sequence component, resistor 51 connected between input 52 and summing point 53 and resistor 50 connected between input 52 and junction 54 are not needed and can be considered to be infinite.

Before proceeding further with this discussion, it should be pointed out that the components that make up the sequence sensitive circuit 10 have been given general, algebraic values and it will be shown that by assigning certain values to the components, the output E can be made to be solely a function of the positive sequence component of the current flowing in a selected power conductor, solely a function of the negative sequence component of the current flowing in a selected power conductor or a function of both the positive sequence component and the negative sequence component of current flowing in a selected power conductor.

Consider now the sequence sensitive circuit of FIG. 1 in which the resistor 46 is zero ohms, resistor 49 is infinite in value, resistor 41 has the value 8R ohms, resistor 44 has the value 3R ohms, resistor 45 has the value 6R ohms, resistor 48 has the value 2R ohms and capacitor 47 has a reactance of $\sqrt{3}$ R ohms at the power system frequency. Under these conditions, the current $i_s$ flowing through summing point 53 is given by the following equation:

$$i_s = \frac{E_{xy}}{8R} + \frac{E_{xy}}{4R\sqrt{3}} \angle{-30°} + \frac{E_{xy}}{8R\sqrt{3}} \angle{-30°} \quad (1)$$

Equation (1) can be written as follows:

$$i_s = \frac{1}{8R}[E_{xy} + 1.155\ E_{yz} \angle{-30°} + 0.577\ E_{zx} \angle{-30°}] \quad (2)$$

and the output, E, of operational amplifier is:

$$E = \frac{-G}{8}[E_{xy} + 1.155\ E_{yz} \angle{-30°} + 0.577\ E_{zx} \angle{-30°}] \quad (3)$$

It is well known to those skilled in the art that in accordance with the theory of symmetrical components, equation (1) can be written to provide an expression for E as a function of the positive and negative sequence components of the signal of conductor X by making the following substitutions into equation (1)

$$E_{xy} = (1-a^2)\ E_{x1} + (1-a)\ E_{x2} \quad (4)$$

$$E_{yz} = (a^2-a)\ E_{x1} + (a-a^2)\ E_{x2} \quad (5)$$

$$E_{zx} = (a-1)\ E_{x1} + (a^2-1)\ E_{x2} \quad (6)$$

where $E_{x1}$ is proportional to the positive sequence component of the current in conductor X and $E_{x2}$ is proportional to the negative sequence component of the current in conductor X, and $a$ represents the unit vector $e^{j120}$, $j$ representing a 90° rotational operator.

Equation (1) then becomes $$E = 0E_{x1} + \frac{G\sqrt{3}}{8}E_{x2} \angle{-150°} \quad (7)$$

Equation (7) states that the signal E has no response to positive sequence components, has an amplitude proportional to the amplitude of the negative sequence component and has a phase that lags the negative sequence component of the current in line X by 150°.

When the signal $E_{xy}$ is applied to input 32 and the signal $E_{zx}$ is applied to input 30 the expression for E as a function of the positive and negative sequence components is given by the equation $$E = 0E_{x2} + \frac{G\sqrt{3}}{8}E_{x1} \angle{+30} \quad (8)$$

Equation (8) states that the signal E has no response to the negative sequence components and has an amplitude proportional to the amplitude of the positive sequence components and has a phase that leads the positive sequence component of current in line X by 30°.

For certain applications of sequence sensitive circuits it is desirable for the circuit to have a response that is a function of both the positive sequence component and the neqative sequence components. For example, if the circuit is being used as part of a fault detection scheme in a three phase power system, the circuit could then detect certain three phase faults which contain only positive sequence components of current.

By assigning appropriate values to the components of the sequence sensitive circuit 10, the output E can be made to be a function of both the positive sequence component and the negative sequence components of current in line X. If the following values are assigned to the circuit:

| | |
|---|---|
| Resistor 41 | 8R |
| Resistor 44 | 3(1−J)R |
| Resistor 45 | 3(2+J)R |
| Resistor 46 | J(1+J)R |
| Resistor 48 | 2R |
| Resistor 49 | 8R |
| Capacitor Reactance 47 | $\frac{-J}{\sqrt{3} R}$ | where J is a fraction representing the desired amount of positive sequence response relative to negative sequence response. With the above circuit values the output E is given by the following equation:

$$E = \frac{-G}{8R} [E_{xy} + J E_{zx} + \frac{(1-J) E_{xy} \angle -30}{\sqrt{3}} + \frac{(2+J) E_{yz} \angle -30}{\sqrt{3}}] \quad (9)$$

By substituting for $E_{xy}$, $E_{yz}$ and $E_{zx}$, the expression of equation (4), (5) and (6) the above equation becomes:

$$E = + \frac{\sqrt{3} G}{8} [J E_{x1} \angle 30 + E_{x2} \angle -150] \quad (10)$$

From equation (10) it can been seen that the positive sequence component of the output is 180° out of phase from the negative sequence component of the output. The output signal will be a minimum for a phase X to ground fault wherein $E_{x1} = E_{x2}$ and the output signal will be a maximum for a phase Y-to-phase Z fault wherein $E_{x1} = -E_{x2}$. All other fault conditions will result in some intermediate output signal level.

It is also of interest to note that desired amount of positive sequence response can be changed without affecting the magnitude or phase of the response to the negative sequence component.

The values of resistors 44, 45, 46 and 48 were selected to minimize the value of the capacitor 47. Capacitor 47 will be a minimum when resistor 48 is equal to the sum of resistor 46 and the parallel combination of resistors 44 and 45.

During the prior discussion it has been a requirement that the signals $E_{xy}$, $E_{yz}$ and $E_{zx}$ do not contain any zero sequence components. The circuit of FIG. 1 can be readily adapted to handle input signals that contain zero sequence components by assigning appropriate values to resistors 50 and 51. The signal $E_{00}$ applied to resistors 50 and 51 at input 52 is equal in magnitude but opposite in phase with the zero sequence components in the signals $E_{xy}$, $E_{yz}$ and $E_{zx}$. Since the current flowing in conductor 14 is proportional to the zero sequence components of current, the signal $E_{00}$ can be obtained by means of an appropriately scaled current transformer connected in line 14. If the value of resistor 51 is made equal to the parallel combination of resistors 41 and 49, a current $i_4$ will flow out of the summing point 53 and through resistor 51 that will exactly equal the sum of the zero sequence component of current flowing into the summing point 53 from resistor 41 and the zero sequence component of current flowing into the summing point 53 from resistor 49. In a similar fashion the zero sequence current flowing into junction 54 from the signals $E_{yz}$ and $E_{zx}$ is balanced out by the current flowing out of junction 54 and through resistor 50. The value of resistor 50 is equal to the parallel combination of resistors 44 and 45 and the value of resistor 46 must be appropriately selected.

It should also be pointed out that although resistor 46, resistor 48 and capacitor 47 respond to both the $E_{yz}$ and the $E_{zx}$ signals, separate networks could have been used to process the $E_{yz}$ and $E_{zx}$ signals. The embodiment disclosed in the Figure is preferred because it only uses a single reactive component.

Figure 2:
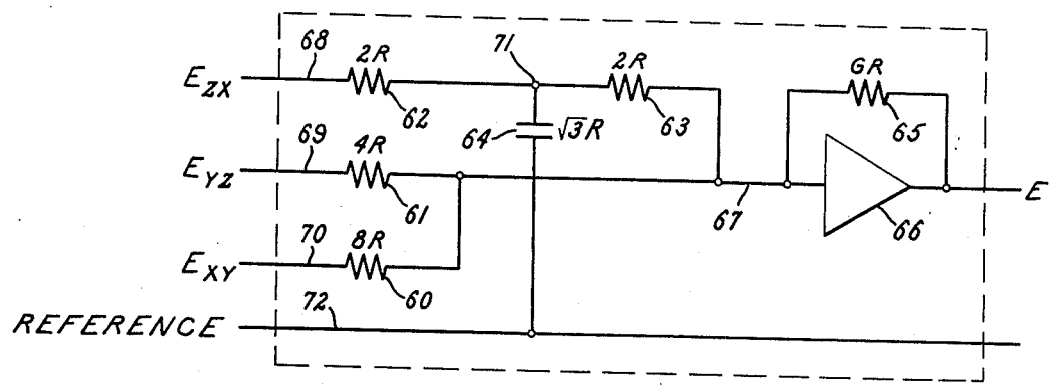
FIG. 2 is a schematic of a sequence selective circuit having a phase shift of 90° from the circuit illustrated in FIG. 1.

FIG. 2 is a schematic diagram of a sequence selective circuit having a slightly different but similar configuration to the circuit previously described. By appropriate selection of the components, the circuit of FIG. 2 can be made to have a pure positive or pure negative response having a 90 degree leading phase shift with respect to the signal generated by the circuit of FIG. 1.

As shown in FIG. 2 a resistor 60 having a value 8R is connected between the input 70 and the summing point 67 and resistor 61 having a value 4R is connected between the input 69 and the summing point 67. Resistor 62 having a value 2R is connected between input 68 and junction 71 and resistor 63 having a value 2R is connected between junction 71 and summing point 67. Capacitor 64 having a reactance of $\sqrt{3} R$ at the power line frequency is connected between junction 71 and the reference on line 72. Operational amplifier 66, having a gain determined by resistor 65 having a value GR responds to the current flowing at the summing point 67. The output of the circuit of FIG. 2 is given by the following equation $$E = \frac{-G}{8R} [E_{xy} + 2E_{yz} + \sqrt{3} E_{zx} \angle -30°] \quad (11)$$

Now, substituting the relationships of equations (4), (5) and (6) into equation (11):

$$E = 0 E_{x1} + \frac{3G}{8} E_{x2} \angle -60° \quad (12)$$

Comparing equation (12) with equation (7) it is apparent that the negative sequence response generated by the circuit of FIG. 2 leads the negative sequence response generated by the circuit of FIG. 1. It is also obvious that the amplitude of the signal generated by the circuit of FIG. 2 can be made equal to the amplitude of the signal generated by the circuit of FIG. 1 by adjusting the gain resistor 65. Another approach for making the amplitude of the signal generated by the circuit of FIG. 2 equal to the amplitude of the signal generated by the circuit of FIG. 1 is to scale all of the components except resistor 65 by a factor of $\sqrt{3}$.

The preferred approach for making the amplitude of the signal generated by the circuit of FIG. 2 equal to the amplitude of the signal generated by the circuit of FIG. 1 requires that gain resistor 65 equal gain resistor 42 and capacitor 64 equal capacitor 47. This can be accomplished by scaling resistors 60 and 61 by a factor of $\sqrt{3}$ and by scaling the sum of resistors 62 and 63 by a factor of $\sqrt{3}$ while still maintaining the parallel combination of resistors 62 and 63 equal to R.

Again, if the signal $E_{zx}$ is applied to input 70 and the signal $E_{xy}$ is applied to input 68, the circuit of FIG. 2 will have a pure positive response which can be represented by the following equation:

$$E = \frac{3G}{8} E_{r1} \; \underline{/+120°} \qquad (13)$$

Figure 3:
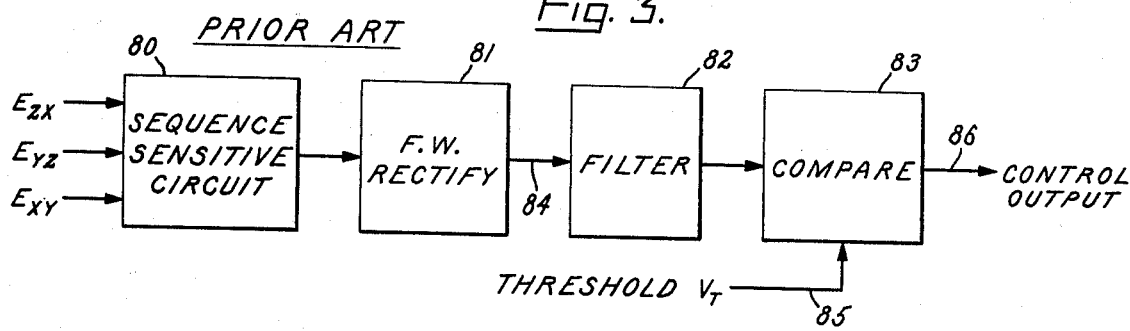
FIG. 3 is a block diagram illustrating the prior art approach for generating a control signal from the sequence selective circuit output.
Figure 4A:
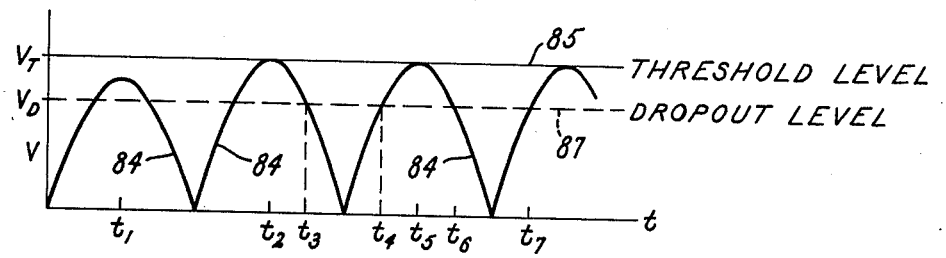
FIG. 4 depicts waveforms illustrating the operation of the circuit shown in FIG. 3.
Figure 4B:
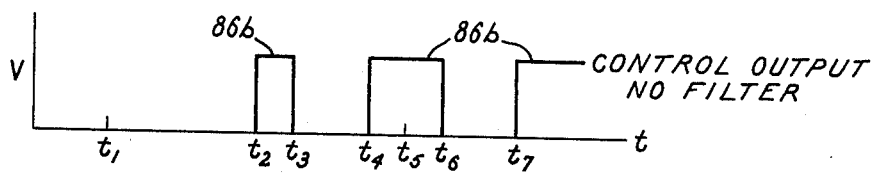
Figure 4C:
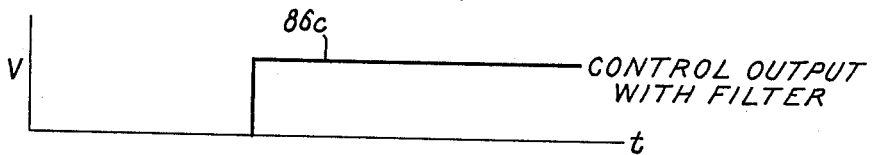

The sequence sensitive circuits of FIGS. 1 and 2 both provide a sinusoidal output. In general, the output of the sequence sensitive circuit must be further processed before a useful control signal (for example, one that will operate a relay) is generated. FIG. 3 is a block diagram of a typical prior art approach for deriving such a control signal. The sine wave output of the sequence sensitive circuit 80 is applied to a full wave rectifier 81. The output 84 of rectifier 81 is applied to a filter 82 and the filter output is applied to a comparison circuit 83. The comparison circuit provides the control signal output 86 when the filter output equals or exceeds the threshold level $V_T$ at 85. Generally the comparison circuit 83 has some hysteresis which means that once the control output has been activated, the input to the comparison circuit must fall below a dropout level 87, shown as 0.707 $V_T$, before the control output will be deactivated. If the comparison circuit 83 operates directly on the rectifier output 84, signals at or near the threshold level will not provide a continuous control signal output as illustrated in FIG. 4B. It is common, therefore to provide a filter 82 which maintains a signal at the input of the comparison circuit 83 even though the rectifier output 84 falls below the dropout level $V_D$. Since the filter 82 also causes a delay in detecting that the rectifier output 84 has exceeded the threshold $V_T$, it is desirable to use a small filter.

Figure 5:
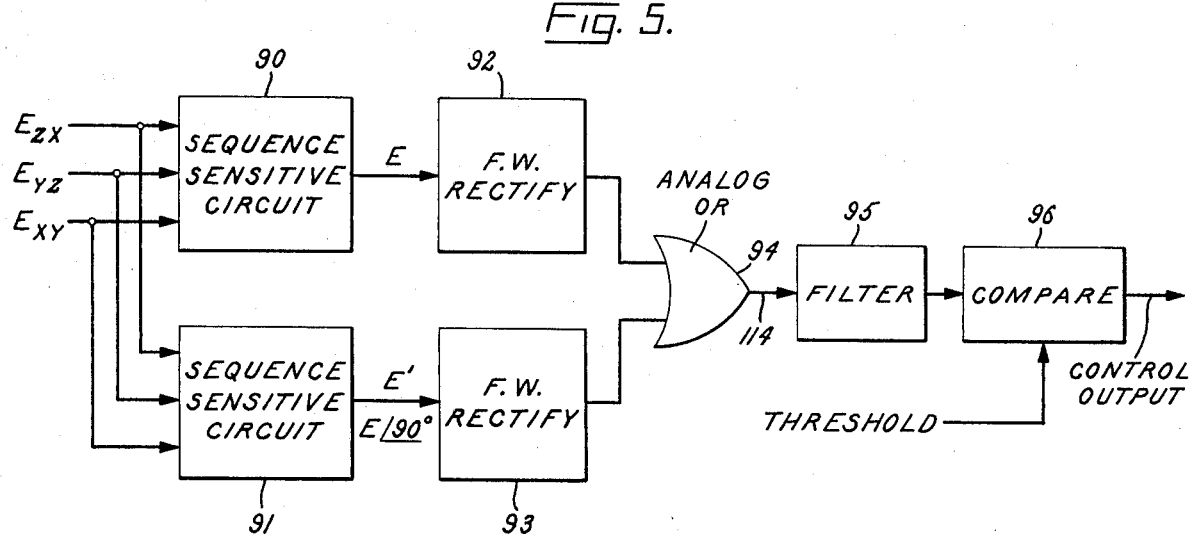
FIG. 5 is a block diagram illustrating an embodiment of my invention that generates a control signal from the sequence selective circuit.
Figure 6:
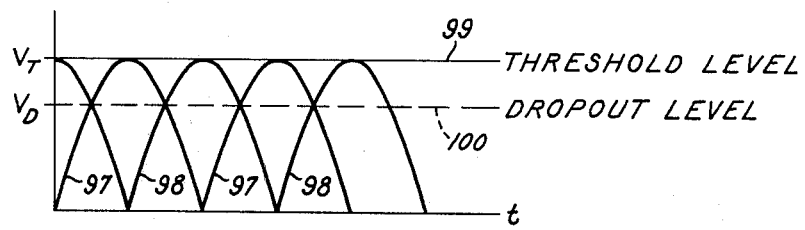
FIG. 6 depicts waveforms illustrating the operation of the circuit shown in FIG. 5.

FIG. 5 shows one embodiment for reducing the the amount of filtering required to process the sequence sensitive circuit output. A first sequence sensitive circuit 90, such as that shown in FIG. 1 generates a first signal E and a second sequence sensitive circuit such as that shown in FIG. 2 generates a second signal E' having the same amplitude but shifted in phase from the signal E by 90°. The signals E and E' are rectified by full wave rectifiers 92 and 93 respectively. The output of rectifiers 90 and 91 are applied to an analog OR circuit 94 whose output will be determined by that input signal having the greatest magnitude. The output of the analog OR circuit is then applied to a filter 95 which drives a comparison circuit 96. In FIG. 6, rectified sinewave 97 is derived from the output of sequence sensitive circuit 90 and rectified sinewave 98 is derived from the output of sequence sensitive circuit 91. As in the discussion of the circuit of FIG. 3, the theshold voltage 99 is shown as $V_T$ and the dropout level 100 is shown as $V_D$ and is equal to 0.707 $V_T$. It is to be noted that in this case when the peak amplitude of the rectified sine waves are both equal to $V_T$, at least one of the two rectified sinewaves will be equal to or greater than the dropout level, $V_D$. In other words, the comparator can operate directly on the output of the analog OR circuit 94. In many applications, it is desired to operate with a dropout level greater than 0.707 $V_T$ which means that a filter 95 is still required. However, it is clear that the amount of filtering required will be less than that required for the prior art circuit of FIG. 3.

Figure 7:
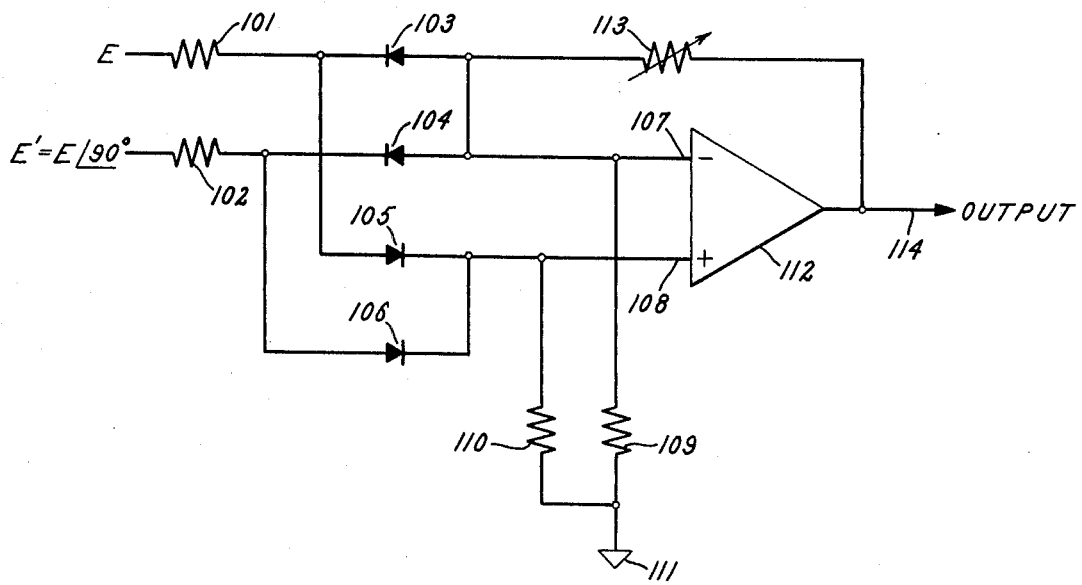
FIG. 7 is a schematic of a preferred embodiment for accomplishing the rectifying and analog OR-ing functions, shown in block form in FIG. 6.

Using conventional circuit design techniques each full wave rectifier 92, 93 would use two operational amplifiers and the analog OR circuit 94 would use an amplifier. FIG. 7 shows a simple circuit using a single differential amplifier that performs the equivalent of the rectification and OR-ing of the signals E and E'.

As shown in FIG. 7 the signal E is applied, through resistor 101, to the cathode of diode 103 and to the anode of diode 105. Similarly, the signal E' is applied, through resistor 102, to the cathode of diode 104 and to the anode of diode 104. The anode of diodes 103 and 104 are both connected to the inverting input 107 of differential amplifier 112 and the cathode of diodes 105 and 106 are both connected to the non-inverting input of differential amplifier 112. Resistor 109 is connected between the inverting input 107 of differential amplifier 112 and the reference 111 and resistor 110 is connected between the non-inverting input 108 of differential amplifier 12 and reference 111. Variable resistor 113 is connected between the inverting input 107 and the output 114 of the operational amplifier 112.

When the signals E and E' are both negative, diodes 105 and 106 are non-conducting and the output 114 will be proportional to the more negative input. If either E or E' is positive, current will flow through diode 105 or 106 depending on which input signal is more positive. Amplifier 112 then operates in a differential mode and the output 114 will be related to that input having the greater magnitude.

While the present invention has been described with reference to a specific embodiment thereof, it will be obvious to those skilled in the art that various changes and modifications may be made without departing from the invention in its broader aspects.

What is claimed as new and desired to be secured by Letters Patent of the United States is:

1. A sequence sensitive circuit responsive to phase signals in three phase vectorial relation, said three phase signals being fully represented as the sum of balanced three phase positive sequence components and balanced three phase negative sequence components, said circuit generating an output current signal proportional to said components of one sequence but not to said components of the other sequence, which comprises:
 a. first circuit means responsive to a first of said phase signals for generating a first current signal having a desired proportion to and in phase with said first phase signal;
 b. second circuit means responsive to the second and third phase signals for generating a second current signal, said second current signal having a first current component having said desired proportion to 1.155 times the amplitude of the second phase signal and having a phase lag of 30° from said second phase signal, and a second current component having said desired proportion to 0.577 times the amplitude of the third phase signal and having a phase lag of 30° from said third phase signal and c. third circuit means responsive to the first and second generated current signals for generating an output signal current proportional to the sum of said first and second generated current signals.

2. A sequence selective circuit as recited in claim 1: wherein the three phase signals have a common reference;

wherein the first circuit means is a resistor connected between the first phase signal and a summing point, wherein the second circuit means comprises a second resistor having one end connected to the second phase signal, a third resistor connected between the other end of the second resistor and the summing point, a fourth resistor connected between the third phase signal and the junction of the second and third resistors, and a capacitor connected between the common reference and the junction of the second and third resistors; and wherein the third circuit means is an operational amplifier responsive to the signal at the summing point.

3. A circuit as recited in claim 2 wherein the first resistor is four times the value of the third resistor, the second resistor is 1.5 times the value of the third resistor, the fourth resistor is 3 times the value of the third resistor and the capacitive reactance at the power system frequency is 0.866 times the value of the third resistor.

4. A sequence sensitive circuit as recited in claim 1 wherein the three phase signals are fully represented as the sum of balanced positive sequence components, balanced negative sequence components and balanced zero sequence components, said sequence sensitive circuit additionally comprising fourth circuit means responsive to a signal proportional to said zero sequence components for generating a third signal equal in magnitude and opposite in phase from the zero sequence component of said first generated signal;

and wherein the second circuit means includes additional circuit means responsive to said proportional to the zero sequence component for removing the zero sequence components from said second generated signal;

and wherein the third circuit means is additionally responsive to the third generated signal and provides an output signal proportional to the sum of the first, second, and third generated signals.

5. A sequence sensitive circuit responsive to phase signals in three phase vectorial relation, said three phase signals being fully represented as the sum of balanced three phase positive sequence components and balanced three phase negative sequence components, said circuit generating an output current signal proportional to said components of one sequence but not to said components of the other sequence, which comprises:

a. first circuit means responsive to a first of said phase signals for generating a first current signal having a desired proportion to and in phase with said first phase signal;

b. second circuit means responsive to a second said phase signal for generating a second current signal having said desired proportion to 1.155 times the amplitude of the second phase signal and having a phase lag of 30° from said second phase signal;

c. third circuit means responsive to the third said phase signal for generating a third current signal having said desired proportion to 0.577 times the amplitude of the third phase signal and having a phase lag of 30° from said third phase signal; and d. fourth circuit means responsive to the first, second, and third generated signals for generating an output signal current proportional to the sum of said first, second, and third generated current signals.

6. A sequence sensitive circuit responsive to phase signals in three phase vectorial relation, said three phase signals being fully represented as the sum of balance three phase positive sequence components and balanced three phase negative sequence components, said circuit generating an output current signal proportional to said components of one sequence but not to said components of the other sequence, which comprises:

a. first circuit means responsive to a first of said phase signals for generating a first current signal having a desired proportion to and in phase with said first phase signal;

b. second circuit means responsive to a second said phase signal for generating a second current signal having said desired proportion to 2 times the amplitude of the second phase signal and having the same phase as said second phase signal;

c. third circuit means responsive to the third said phase signal for generating a third current signal having said desired proportion to 1.732 times the amplitude of the third phase signal and having a phase lag of 30° from said thrid phase signal; and d. fourth circuit means responsive to the first, second, and third generated signals for generating an output signal current proportional to the sum of said first, second, and third generated current signals.

7. A sequence sensitive circuit as recited in claim 6 wherein the three phase signals have a common reference, wherein the first circuit means is a first resistor connected between the first phase signal and a summing point;

wherein the second circuit means is a second resistor connected between the second phase signal and the summing point;

wherein the third circuit means comprises a third resistor having one end connected to the third phase signal, and a fourth resistor connected between the other end of the third resistor and the summing point and a capacitor connected between the common reference and the junction of the third and fourth resistors; and wherein the fourth circuit means is an operational amplifier responsive to the signal at the summing point.

8. A sequence sensitive circuit as recited in claim 6 wherein the three phase signals are fully represented as the sum of balanced positive sequence components, balanced negative sequence components and balanced zero sequence components, said sequence sensitive circuit additionally comprising fifth circuit means responsive to a signal proportional to said zero sequence components for generating a fourth signal equal in magnitude and opposite in phase from the zero sequence components of said first and second generated signals;

and wherein the third circuit means includes additional circuit means responsive to said signal proportional to the zero sequence component for removing the zero sequence components from said third generated signal;

and wherein the fourth circuit means is additionally responsive to the fourth generated signal and provides an output signal proportional to the sum of the first, second, third and fourth generated signals.

9. A sequence sensitive circuit responsive to phase signals in three phase vectorial relation, said three phase signals being fully represented as the sum of balanced three phase positive sequence components and balanced three phase negative sequence components, said circuit generating an output current signal having a first current component proportional to the positive sequence signal components and having a second current component proportional to the negative sequence signal components and lagging said first current component by 180°, comprising:

a. a first circuit means responsive to a first of said phase signals for generating a first current signal having a desired proportion to and in phase with said first phase signal;

b. second circuit means responsive to said second and third phase signals for generating a second current signal having a first component having said desired proportion to (1.155 + 0.577 J) times the amplitude of the second phase signal and having a phase lag of 30° from said second phase signal, and a second component having said desired proportion to (0.577 − 0.577 J) times the amplitude of the third phase signal and having a phase lag of 30° from said third phase signal;

c. third circuit means responsive to the third phase signal for generating a thrid current signal having said desired proportion to J times the amplitude and in phase with said third phase signal; and d. fourth circuit means responsive to the first, second and third generated signals for generating an output current signal proportional to the sum of said first, second and third generated current signals, said J factor being the fractional ratio of said first and second components of the output signal.

10. A sequence sensitive circuit as recited in claim 9 wherein the three phase signals are fully represented as the sum of balanced positive sequence components, balanced negative sequence components, and balanced zero sequence components, said sequence sensitive circuit additionally comprising fourth circuit means, responsive to a signal proportional to said zero sequence components, for generating a fourth current signal equal in magnitude and opposite in phase from the zero sequence component of said first and third generated signals;

and wherein the second circuit means includes additional circuit means responsive to said signal proportional to the zero sequence component for removing the zero sequence components from said second generated signal;

and wherein the fourth circuit means is additionally responsive to the fourth generated signal and provides an output signal proportional to the sum of the first, second, third and fourth generated signals.

11. A sequence sensitive circuit responsive to a three phase signal system, said three phase signal system being represented as the sum of balanced three phase positive sequence components, balanced three phase negative sequence components, and zero sequence components comprising:

a. a first phase sequence responsive circuit responsive to said three phase signal system for generating a first alternating current signal having an amplitude in predetermined proportion to a selected one of said sequence components;

b. a second phase sequence responsive circuit responsive to said three phase signal system for generating a second alternating current signal having an amplitude in said predetermined proportion to the selected sequence component but having 90° phase difference from said generated current signal; and c. circuit means responsive to the first and second generated signals for generating a unipolar control signal having a magnitude as determined by said generated signal having the greatest magnitude.

12. A sequence sensitive circuit as recited in claim 11 wherein the circuit means comprises:

a. a first full wave rectifier for rectifying the first generated signal;

b. a second full wave rectifier for rectifying the second generated signal; and c. analog OR circuit means responsive to the first and second rectified signals for generating said unipolar control signal.

13. A sequence sensitive circuit as recited in claim 11 wherein the circuit means comprises a differential amplifier having a first differential input responsive to the first alternating signal through a first diode and responsive to the second alternating signal through a second diode, said first and second diodes being poled to prohibit current flow into the first differential input, said differential amplifier having a second differential input responsive to the first alternating signal through a third diode and responsive to the second alternating signal through a fourth diode, said third and fourth diodes being poled to conduct current from the first and second alternating signal inputs to the second differential input.

14. A sequence sensitive circuit responsive to a three phase signal system, said three phase signals being fully represented as the sum of balanced three phase positive sequence components, balanced three phase negative sequence components and zero sequence components, said circuit generating an output current signal proportional to a selected one of said sequence signals comprising:

a. transformer means responsive to the three phase signal system for generating three phase-to-phase signals, said phase-to-phase signals being fully described as the sum of a three phase positive sequence signal system and a three phase negative sequence signal system;

b. second circuit means responsive to a first of said phase-to-phase signals for generating a first current signal having a desired proportion to and in phase with said first phase-to-phase signal;

c. third circuit means responsive to said second and third phase-to-phase signals for generating a second current signal, said second signal having a first component having said desired proportion to 1.155 times the amplitude of the second phase-to-phase signal and having a phase lag of 30° from said second phase-to-phase signal, and a second component having said desired proportion to 0.577 times the amplitude of the third phase-to-phase signal and having a phase lag of 30° from said third phase-to-phase signal; and d. circuit means responsive to the first and second generated signals for generating an output current signal proportional to the sum of said first and second 15. A sequence sensitive circuit responsive to a three phase signal system, said three phase signals being fully represented as the sum of balanced three phase positive sequence components, balanced three phase negative sequence components and zero sequence components, said circuit generating an output current signal proportional to a selected one of said sequence signals comprising;

a. transformer means responsive to three phase signal system for generating three phase-to-phase signals, said phase-to-phase signals being fully described as the sum of a three phase positive sequence signal system and a three phase negative sequence signal system;

b. first circuit means responsive to a first of said phase-to-phase signals for generating a first current signal having a desired proportion to and in phase with said first phase-to-phase signal;

c. second circuit means responsive to said second phase-to-phase signal for generating a second current signal having said desired proportion to 2 times the amplitude of and in phase with the second phase-to-phase signal;

d. third circuit means responsive to said third phase-to-phase signal for generating a third current signal having said desired proportion to 1.732 times the amplitude of the thrid phase-to-phase signal and having a phase lag of 30° from said third phase-to-phase signal; and e. fourth circuit means responsive to the first, second, and third generated signals for generating an output current signal proportional to the sum of said first, second, and third generated signals.

* * * * *